Patented Apr. 4, 1950

2,503,003

UNITED STATES PATENT OFFICE 2,503,003

CELLULAR RUBBER ARTICLE AND PROCESS FOR PRODUCING THE SAME

George K. Simpson, Bayonne, and Winthrope C. Smith, Elizabeth, N. J., assignors to Standard Oil Development Company, a corporation of Delaware No Drawing. Application June 26, 1945, Serial No. 601,718

2 Claims. (Cl. 260—2.5)

This invention pertains to the production of cellular synthetic rubbers and particularly to cellular products prepared from copolymers of isoolefins and polyolefinic materials.

U. S. Patent No. 2,356,128, dated August 22, 1944, by Robert M. Thomas and William J. Sparks describes the preparation of high molecular weight, tough, elastic products by the copolymerization of isoolefins containing less than 8 carbon atoms with conjugated aliphatic diolefin hydrocarbons containing from 4 to 8 carbon atoms in the presence of a Friedel-Crafts type catalyst dissolved in a solvent which forms no complex therewith and is liquid at the reaction temperature, at temperatures between 0° C. and −160° C. The copolymer, in spite of a low degree of unsaturation, is capable of reacting with sulfur or certain sulfur compounds to produce a cured material having high tensile strength and extensibility, an elastic limit, a very great inertness to chemical reactions generally and a good resistance to most solvents, high resistance in abrasion, flexure and aging. A particularly outstanding property of the cured copolymer is its impermeability to gases making it of great value in inner tubes for automobile tires or as a gas barrier for other purposes.

In view of the foregoing properties these rubbery copolymers would appear to be of outstanding value in the production of cellular products such as sponge rubber and the like. Attempts to utilize these copolymers for the production of sponge rubber have met with little success, however, due to poor deformation recovery and abundant cellular tack in the expanded or cellular products.

It is the object of this invention to prepare cellular products from high molecular weight, tough elastic copolymers of isoolefins containing less than 8 carbon atoms per molecule with aliphatic diolefinic hydrocarbons containing from 4 to 8 carbon atoms per molecule prepared by polymerizing said materials at temperatures below 0° C. and in the presence of Friedel-Crafts type catalysts dissolved in an inert solvent which is liquid at reaction temperatures and which does not form a complex with the catalyst.

It is also the object of this invention to prepare cellular products of the said copolymers which have good deformation-recovery properties and which are free or substantially free from cellular tack or the property of the opposite walls of the individual cells sticking together when the product is compressed.

These and other objects will appear more clearly from the detailed description and claims which follow:

It has now been found that improved cellular products can be produced from isoolefin-diolefin low-temperature copolymers by incorporating into the composition a blooming agent or material having a limited solubility in the said copolymers and then expanding the composition into cellular form. By incorporating these blooming agents into the rubbery materials in excess of their solubility in the polymer, they crystallize or migrate to the surface of the polymer composition forming a bloom. This bloom may be either dry or oily and causes a marked decrease in the surface tack or tendency of the cell walls to adhere together when compressed and furthermore effect a marked improvement in the deformation recovery of the composition.

Materials which may be used as blooming agents include sulfur, selenium and tellurium, waxes such as paraffin waxes having melting points of from about 128° F. to about 185° F., fatty acid waxes such as stearic and palmitic acid, and their metallic salts, zinc, aluminum, etc., fatty esters such as glyceryl stearate and aluminum stearate, aromatic ethers such as phenyl xenyl ether, polymerized ester waxes and high boiling (i. e., 250–350° C.) aromatic esters such as dibutyl phthalate, tricresyl phosphate, triphenyl phosphate and the like.

The amount of blooming agent added to the composition in accordance with the present invention is variable depending upon the agent used and other properties desired. In every event, however, the blooming agent is added in amount well in excess of the solubility limit of the particular agent in the rubbery copolymer. Sulfur, for example, may be used in amounts of between about 2 and about 30 parts per 100 parts by weight of copolymer.

In a fully cured article of isobutylene-isoprene copolymer blooming is obtained (indicating that the solubility limits have been exceeded) at between 2 and 3 parts of sulfur per 100 parts of polymer. With a fair amount i. e., about 20 parts per 100 parts of polymer of the hydrocarbon oil Bayol D the blooming occurs between 1 and 2 parts of sulfur per 100 of polymer. Thus the lower limit of sulfur addition may be set at about 2%. However, to be effective, a heavy bloom must be obtained in a short period after cure, and 4–5 parts of sulfur per 100 polymer would be the lower limit. The effect of increased blooming of sulfur, when the hydrocarbon oil is used is not understood. The waxes, fatty esters have a lower blooming limit of about 4-5 parts/100 of polymer, above which satisfactory bloom is obtained. The aromatic ethers, ester waxes should be used above ten parts, and the aromatic ethers above 15 parts per 100 parts of polymer.

It is also necessary to provide an elasticator in the composition. The function of the elasticator in the sponge recipe is threefold. In the first place it serves to increase the elasticity of the cured mass, giving it good resilience or rapid recovery from deformation. Secondly it acts as a plasticizer (an elasticator is always a plasticizer, but all plasticizers are not elasticators) to give a soft mass which is necessary for complete and homogeneous blowing of the rubbery mass. In the third place, the elasticators tend to increase the speed of migration of the sulfur or other blooming agent to the surface of the rubbery mass.

The preferred elasticators used in accordance with the present invention are hydrocarbon oils boiling within the range of about 400 to 750° F. Other elasticators which may be used in combination with substantial quantities of sulfur or other blooming agents are alkyl esters such as trioctyl phosphate, dioctyl sebacate, dibutyloxalate, diamylazelate and the like and low boiling aromatic ethers such as dibenzyl ether and the like. The amount of elasticator used may be varied between about 1 and about 60 parts per 100 parts of polymer depending upon the properties of the polymer itself and upon the properties desired in the finished or cellular rubber mass. In the event that the elasticator shows a substantial degree of incompatibility with the polymer it is advisable to keep the amount of elasticator used sufficiently low so that there is no substantial bleeding of the elasticator out of the rubber compound.

The compositions may also contain the other usual compounding ingredients such as carbon black, zinc oxide or other mineral fillers and pigments, stearic acid, vulcanizing agents of either the sulfur, thiuram, dithiocarbamate oxime or dinitroso type, in order to impart the necessary or desired properties to the final products.

The expansion of the composition into cellular form may be effected in various ways. For example, an inflating agent such as diazoaminobenzene alone or sodium bicarbonate, ammonium carbonate or bicarbonate or the like in conjunction with stearic, oleic acids or alum is incorporated together with proper vulcanizing agents, softeners, fillers and age resisters into the rubbery material. Upon subjecting the composition to curing or vulcanization, the inflating agent is decomposed or reacted producing a gas which expands the rubbery mass. Instead of adding such an inflating agent to the rubbery composition the cellular structure may be imparted to the composition by externally gassing the compound as by placing the uncured stock containing the necessary compounding ingredients in a mold or autoclave and subjecting the compound to the action of a gas such as carbon dioxide or nitrogen under high pressures, thereby causing a certain amount of the gas to dissolve in the compound. When the compound containing the dissolved gas has been partially cured, the gas pressure is lowered causing the mass to rapidly expand forming a myriad of individual non-connecting gas-tight cells in the rubbery mass whereupon the semi-cured articles are given a final cure. The production of good cellular rubber products depends largely on the proper combination of plasticity, quantity and type of blowing agent with the proper speed of vulcanization. Considering a given quantity of blowing agent and given plasticity, if the vulcanization is too slow the blowing agent will spend itself and result in a collapsed product. On the other hand, if the vulcanization is too fast, a very fine cell structure, heavy rind and reduced blowing will result. With the adjustment of these variables, the grade of sponge then depends on good resilience or recovery after deformation.

Three samples of sponge were prepared using the following recipes:

| | A | B | C |
| --- | --- | --- | --- |
| Isobutylene-Isoprene Copolymer | 100 | 100 | 100 |
| Zinc Oxide | 5 | 5 | 5 |
| Stearic Acid | 1.5 | 1.5 | 1.5 |
| Sulfur | 10 | 10 | 8.5 |
| Fine Thermal Black | 18 | 18 | 18 |
| Tuads (Tetramethyl Thiuram (Disulfide)) | 1.25 | 1.25 | |
| Sodium Bicarbonate | 10 | 10 | 10 |
| Aluminum Potassium Sulfate | 12 | 12 | 12 |
| Diazoamino-Benzene | 0.5 | 0.5 | 0.5 |
| Paraffinic Hydrocarbon Oil (B. P. 400-500° F.) | 20 | 20 | 20 |
| Quinone Dioxime Dibenzoate | | | 2 |
| $Pb_3O_4$ | | | 6 |
| Paraffin Wax | | 4 | |

The several recipes were compounded on a mill. One hundred grams of material was slabbed off the mill, placed in a 6" x 6" x 0.5" mold and cured for 40 minutes at 307° F. in a press. This resulted in a blow of 250% completely filling the mold, and giving an apparent density of 0.24–0.255 oz./cu. in. The resultant cellular products showed good resilience or recovery after deformation indicating little or no sticking together of the cell walls.

The stocks cured with Tuads, samples A and B could be cured more rapidly by the addition of 0.5 part of mercaptobenzothiazole or 1.0 part of selenium tetraethyl dithiocarbamate per 100 parts of polymer. This would result in a cellular product having less blow, finer cells but more resilience. Increasing the amount of blowing agent or using a more rapidly acting blowing agent would permit the same degree of blow as obtained with the slower cure while at the same time permitting the retention of the increased resilience obtained with the faster cure.

The foregoing description contains a limited number of embodiments of the present invention. It will be understood, however, that our invention is not limited to the specific details described since numerous variations are possible without departing from the scope of this invention as defined by the following claims.

What we claim and desire to secure by Letters Patent is:

1. A process for the production of cellular material from elastomeric copolymers of low unsaturation prepared by the copolymerization of a major proportion of isobutylene with a minor proportion of isoprene at a temperature below 0° C., by the application to the cold mixture of a dissolved Friedel-Crafts active metal halide catalyst in solution in an inert non-complex forming solvent, the steps in combination of incorporating into 100 parts by weight of polymer, 4 to 10 parts of sulfur, 20 parts of a paraffinic hydrocarbon oil boiling within the range between 400° and 500° F., and about 0.5 part of diazoamino benzene, and thereafter curing the composition for about 40 minutes at 307° F., to produce a mass of small closed cells within the body of the copolymer, the interior of each cell having a sufficient amount of sulfur blooming agent on the surface to prevent adhesion of the cell walls under pressure, the elasticator serving the combined purposes of plasticizer during the milling step, curing aid and blooming agent after completion of the curing softener to facilitate cell-formation during curing, and bloom-promoter.

2. A cellular product having good resiliency and good deformation-recovery properties, and substantially free from cellular tack, comprising a cured, synthetic rubber of low unsaturation type capable of being completely cured with 1 to 3 parts of sulfure per 100 parts of synthetic rubber, said synthetic rubber consisting of a solid, elastic hydrocarbon interpolymer of a major proportion of isobutylene with a minor proportion of isoprene, together with sulfur in a proportion of about 10 parts per hundred of polymer, a hydrocarbon oil boiling within the range between 400° and 500° F., in the proportion of about 20 parts per hundred of polymer, and diazoamino benzene in an amount on the order of magnitude of 0.5 part per hundred of polymer, together with a curing agent, zinc oxide, carbon black, and a sulfurization aid, said cured cellular product containing a mass of small closed cells the interior of each of which has a sufficient amount of sulfur blooming agent on the surface to prevent adhesion of the walls when the cellular product is compressed.

GEORGE K. SIMPSON.
WINTHROPE C. SMITH.

REFERENCES CITED

The following references are of record in the file of this patent:

UNITED STATES PATENTS

| Number | Name | Date |
|---|---|---|
| 2,299,593 | Roberts et al. | Oct. 20, 1942 |

FOREIGN PATENTS

| Number | Country | Date |
|---|---|---|
| 523,248 | Great Britain | July 10, 1940 |

OTHER REFERENCES

Rubber Age, article by Gould, vol. 55, No. 1, April 1944, pages 65–67.